(12) United States Patent
Mileski et al.

(10) Patent No.: US 6,525,762 B1
(45) Date of Patent: Feb. 25, 2003

(54) WIRELESS UNDERWATER VIDEO SYSTEM

(75) Inventors: Paul M. Mileski, Mystic, CT (US); Roy R. Manstan, East Haddam, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 390 days.

(21) Appl. No.: 09/613,046

(22) Filed: Jul. 5, 2000

(51) Int. Cl.$^7$ ................................................ H04N 7/18
(52) U.S. Cl. ............................ 348/81; 348/143; 455/66
(58) Field of Search ........................... 348/81, 82, 143; 455/66; 119/421; H04N 7/18

(56) References Cited

U.S. PATENT DOCUMENTS

| | | | |
|---|---|---|---|
| 3,688,029 A | * 8/1972 | Bartoe, Jr. et al. | 348/81 |
| 4,268,858 A | * 5/1981 | Wood | 348/143 |
| 5,646,677 A | * 7/1997 | Reber | 348/81 |
| 6,119,630 A | * 9/2000 | Lobsiger et al. | 119/421 |

* cited by examiner

*Primary Examiner*—Howard Britton
(74) *Attorney, Agent, or Firm*—Michael J. McGowan; James M. Kasischke; Michael F. Oglo

(57) ABSTRACT

A Wireless Underwater Video System for obtaining live video/audio data to profile a designated area of an ocean bottom is described. The system includes a video camera enclosed in a water tight housing which produces video and audio signals which are transmitted to a transmitting buoy having a power source, electronics for conditioning the video/audio signals and a position stablizer. The conditioned video signals are then transmitted from the buoy to an observer on a platform over a radio frequency link.

8 Claims, 2 Drawing Sheets

WIRELESS UNDERWATER VIDEO SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

This invention relates to a surveillance system to map out for surveillance a particular ocean bottom area under investigation and more particularly to a video/audio system for taking a profile of designated areas in the ocean by taking live data using a wireless video system.

(2) Description of the Prior Art

It is well known in the prior art to allow a diver operating in an underwater environment to take photographs of certain areas under investigation using a video/audio recording system for playing back at a later time. But this approach does not allow the real time evaluation which is important in a research environment. Another method used in the prior art is to utilize an underwater camera and microphone tethered by a conducting cable to the surface for real time viewing. Although this option provides real time evaluation, the required tethering disturbs the dive site and limits the distance between the topside observer and the underwater activity. These considerations restrict the operation such as archeological research involving wrecks spread over a large area. There is thus a need for a system which facilitates taking live data having both video and audio components with maximum flexibility.

SUMMARY OF THE INVENTION

Accordingly, it is a general purpose and object of the present invention to provide a system and method of operation thereof, that provides live video and audio data so as to profile a designated area of the ocean bottom.

Another object of subject invention is to obtain live video/audio data of the area of the ocean floor under investigation.

Still another object of subject invention is to obtain live video/audio data for archeological search involving wrecks spread over large areas of the ocean floor.

These objects are accomplished by using an underwater video camera and a microphone housed in a water tight movable housing having electrical connections between the video camera and the microphone. The video and audio signals are then sent via the appropriate electrical connections, such as a buoyant cable to a transmitting buoy, the electronics, means for supplying power to the electronics, a buoy position stablizer, and an r.f. transmitter. The video/audio live data obtained by using the video camera/microphone combination is transmitted to the buoy where it is conditioned and transmitted to an observer on a platform over a radio frequency link.

BRIEF DESCRIPTION OF THE DRAWINGS

A more complete understanding of the invention and many of the attendant advantages thereto will be readily appreciated as the same become better understood by reference to the following detailed description when considered in conjunction with accompanying drawings wherein like reference characters indicate like corresponding parts throughout the several views of the drawings wherein.

DESCRIPTION OF THE PREFERRED EMBODIMENTS

Figure 1:
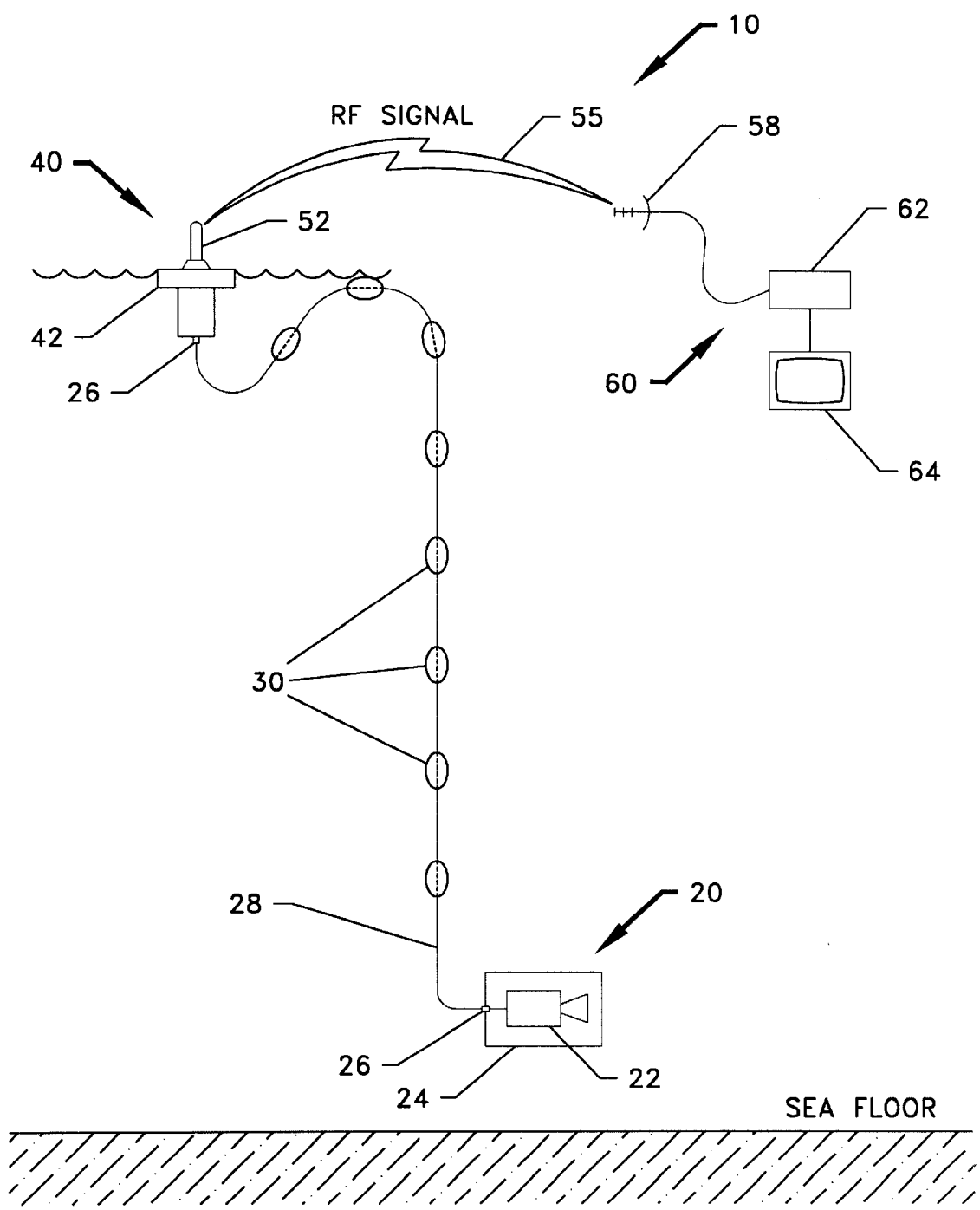
FIG. 1 is a diagrammatic representation of the Wireless Underwater Video System according to the teachings of subject invention.

Referring now to the drawings and, more particularly to FIG. 1, there is shown a wireless underwater video/audio system 10 for obtaining live video/audio data to profile a designated area of an ocean bottom.

Figure 2:
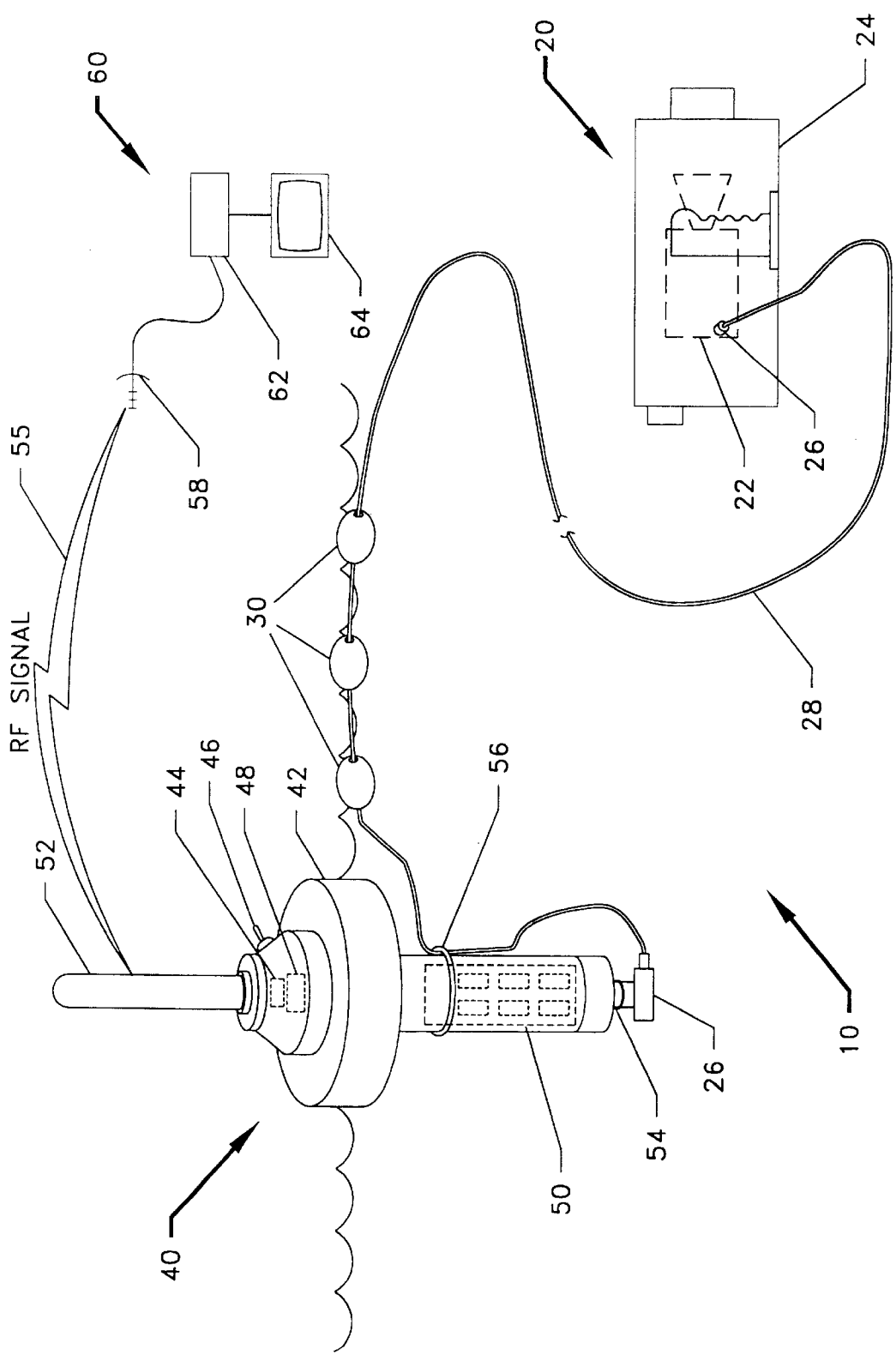
FIG. 2 is a more detailed representation of various components of the Wireless Underwater Video System of subject invention.

In one presently preferred embodiment 10 of the present invention, as shown in FIGS. 1 and 2, this invention comprises four subsections: (1) an underwater camera and housing designated as 20 which utilizes a video camera 22 enclosed in housing 24. Any good commercial camera such as a typical SONY camera can be used. The housing 24 must be water tight for the camera to work in water free environment. The only modification to these components is the addition of an underwater bulkhead connector 26 which preserves the water tight integrity of the housing. The connector 26 is used at one end of cable 28 which carries the video/audio signal to the second subsection (2) a video transmitting buoy 40. It should be noted that cable 28 is fitted with a plurality of floats 30 in order to keep the cable 28 buoyant. Buoy 40 comprises a floating housing 42 which has electronic package 44, including an amplifier, a video modulator 48, a power source e.g. batteries 50 is controllable by switch 46 and an antenna 52. Buoy 40 also includes an o-ring 54 to make it water tight and a collar 56 to act as a position stablizer. R.F. signal 55 is transmitted by the transmitter 52 of buoy 40 and is received by antenna 58 of the receiving platform 60 which includes receiver 62 and a display unit 64.

In operation, a diver manipulates the underwater camera as needed. A video/audio signal is sent to buoy 40 which, after processing, is sent over to the video transmitting buoy antenna 52 and received over a radio frequency (RF) link by the receiving platform 60.

It should be noted that the buoy housing 42 is constructed of PVC pipe sections of various diameter and shape resulting in the overall form as depicted in FIG. 2. These sections are glued together, with the exception of the bottom, which consists of a removable pvc plug 26. This plug contains an underwater connector (type E-O) and a radial o-ring 54 which seals the plug to the inner diameter of the PVC housing. Proper waterline location and center of buoyancy to center of gravity separation is maintained by a floatation collar 56 constructed of closed cell urethane foam.

Video modulator 48 converts the video and audio signals to a user selected UHF television channel. This UHF signal is adjusted to be between channels 18 and 19 in an attempt to prevent any interference with existing services. The output of modulator 46, approximately -15 dBm ($3.2 \times 10^{-5}$ watts), is increased to a level approximately 10 dBm (10 milliwatts) by an amplifier mounted on the video modulator. All the electronics are modified or designed to operate on 24 to 29 volts. The battery pack 50, consisting of six nine volt alkaline transistor radio batteries connected in series-parallel, provides an operating life in excess of six hours.

The antenna 52, a raised ¼ wave monopole, is comprised of the inner conductor and dielectric of a section of RG-8 coaxial located within a watertight protrusion on the top of the buoy 40 and a ground plane consisting of a copper coating on the inner surface of the buoy housing which extends fully from the top of the buoy housing (below the protrusion) to a point approximately 7 inches below the top, approximately 4.5 inches below the waterline. The coaxial cable from the transmitter has its shield connected to the ground plane at its highest point. This grounding system, in addition to providing a return current path for the RF via coupling to the sea water through the pvc housing, also acts as a ¼ wavelength choke balun, which reduces unbalanced RF currents. This antenna was chosen in an attempt to reduce signal variation at the receiver resulting from wave action.

The underwater buoyant cable assembly 28 provides the connectivity between the underwater housing/camera and the video transmitting buoy floating at the surface. The cable utilizes floatation to both prevent disturbance of the dive site and reduce risk of entanglement with the diver or nearby objects. The cable is standard two conductor unshielded cable chosen as a compromise of cost, weight, diameter, ruggedness and ease of splicing to existing underwater connector pigtails.

The receiving and display unit 60 is responsible for receiving the RF signal, extracting the video and audio signals from this signal, and making them available for viewing and listening. This subsection includes the receiving antenna 58 and includes, receiving electronics, video demodulator, video display and audio system. For the testing of this invention, an off the shelf 12 element receiving antenna (Yagi with a reflector) was used as the receiving antenna. The receiving electronics was a video cassette recorder (VCR) with an adjustable receive frequency RF front end (an old varacter tuner type) adjusted to the transmit frequency of channel 18+. The video output of this VCR was connected to a standard video monitor.

In summary., the present invention is related to a system for obtaining video/audio data for obtaining a profile of a designated area of an ocean bottom. The system obtains video signals related to the area under investigation and transmits them as live data to the receiving platform via a transmitting buoy over a radio frequency link.

It should be noted that many modifications are possible without deviating from the teaching of subject invention. As an example, different video cameras can be used for the video signals. The buoy arrangement can be varied by using different components without deviating from the teachings of subject invention. Consequently, such design changes may be made by those skilled in the art within the principle and scope of the invention as expressed in the appended claims.

What is claimed is:

1. A wireless underwater video/audio system for profiling a designated area of an ocean bottom which comprises:
   a video camera secured in a water proof movable housing placed in said designated area of the ocean bottom;
   a floating cable connected to said video camera at a first end thereof;
   a buoy located at the top surface of said designated area of said designated of the ocean bottom;
   electronics means housed in said buoy, said electronics means connected to a second end of said floating cable to transmit video/audio signals from said video camera to said buoy; and
   means for conditioning said video/audio signals for transmission thereof to an observer on a designated platform.

2. The wireless underwater video/audio system of claim 1 wherein said buoy includes a position stablizer to improve transmission of said video/audio signals from said buoy to an observer.

3. The wireless video/audio system of claim 2 which also includes a power source to activate said electronics in said buoy.

4. The wireless video/audio system of claim 3 which also includes an antenna for transmitting said video/audio signals from said buoy to said observer on said platform.

5. The wireless video/audio system of claim 2 wherein said electronics means includes a radio frequency transmitter.

6. The wireless video/audio system of claim 1 wherein said floating cable includes a plurality of floats for making said floating cable buoyant.

7. A method for obtaining a profile of a designated ocean bottom area using a wireless video/audio system including a video camera in a movable waterproof camera housing at said designated ocean bottom area, said camera video signals connected to stabilized transmitting buoy including an electronics package and transmitting said camera video signals over radio frequency link to a receiving platform, said method including the steps of:
   obtaining video/audio signals using said video camera;
   transmitting said video signals to said buoy by using said floating cable to said electronics means; and
   transmitting said video/audio signals to an observer on a platform using an r.f. transmitter of said electronics means.

8. The method of claim 7 wherein the step of transmitting video/audio signals from said buoy further includes the step of providing power to said electronics means.

\* \* \* \* \*